US012759194B2

(12) United States Patent
Chuang

(10) Patent No.: US 12,759,194 B2
(45) Date of Patent: Oct. 13, 2026

(54) RECYCLING PROCESSING METHOD FOR WIND TURBINE BLADES

(71) Applicant: TYGE Technology CO., LTD., Taoyuan City (TW)

(72) Inventor: Wen-Yen Chuang, Taoyuan City (TW)

(73) Assignee: TYGE TECHNOLOGY CO., LTD., Taoyuan City (TW)

( * ) Notice: Subject to any disclaimer, the term of this patent is extended or adjusted under 35 U.S.C. 154(b) by 105 days.

(21) Appl. No.: 18/980,507

(22) Filed: Dec. 13, 2024

(65) Prior Publication Data

US 2025/0196398 A1 Jun. 19, 2025

(30) Foreign Application Priority Data

Dec. 14, 2023 (CN) ......................... 202311715678.3

(51) Int. Cl.
*B29B 17/02* (2006.01)
*B29B 17/00* (2006.01)

(52) U.S. Cl.
CPC ...... *B29B 17/02* (2013.01); *B29B 2017/0021* (2013.01); *B29B 2017/0286* (2013.01); *B29B 2017/0293* (2013.01)

(58) Field of Classification Search
None
See application file for complete search history.

(56) References Cited

U.S. PATENT DOCUMENTS

2023/0057162 A1* 2/2023 Li ........................... C04B 18/04

FOREIGN PATENT DOCUMENTS

CN 116274253 B * 8/2023 ............... B09B 3/00
WO WO-2016177305 A1 * 11/2016 ............. C08J 11/22

OTHER PUBLICATIONS

English Machine Translation for CN-116274253-B (Year: 2023).*

* cited by examiner

*Primary Examiner* — Kaj K Olsen
*Assistant Examiner* — Pradhuman Parihar
(74) *Attorney, Agent, or Firm* — MUNCY, GEISSLER, OLDS & LOWE, P.C.

(57) ABSTRACT

A recycling processing method for wind turbine blades, which uses an acidic degradation solution for recycling waste material from wind turbine blades, mainly using a hardware design that involves immersing waste material comprising composite material of fiberglass or carbon fiber in the acidic degradation solution, effectively causing the composite waste material to swell and separate to form degradable glass fiber cloth, which is finally cleaned and dried to achieve a glass fiber cloth with no surface residual glue and a resin degreasing rate of 99.6%. Accordingly, effectively achieving recyclables by carrying out a degradation process at normal temperature to save hardware costs, and enabling reclaiming the degradation solution using fractionation by distillation, which can then be reused. Hence, the recycling processing method has the advantages of involving a simple manufacturing process, high efficiency, and the ability to process waste materials on-site, without bearing the high cost of transportation.

7 Claims, 24 Drawing Sheets

| Temperature (℃) | Time (hours) |
| --- | --- |
| 80 | 0.8 |
| 65 | 2.5 |
| 50 | 8.5 |
| 20 | 65 |
| 5 | 480 |

RECYCLING PROCESSING METHOD FOR WIND TURBINE BLADES

BACKGROUND OF THE INVENTION

(a) Field of the Invention

The present invention relates to a recycling processing method for wind turbine blades, and more particularly to a processing method that uses an acidic degradation solution to recycle waste material from wind turbine blades.

(b) Description of the Prior Art

Wind driven generators are also called wind turbines, or referred to as wind generators, which are wind power generation devices that convert the kinetic energy of air flow into mechanical energy, and is one of the essential elements that constitute a wind power plant. Wind turbines mainly drive and rotate wind turbine blades through wind power, with the rotary speed of the blades being increased by means of a speed increaser, thereby actuating an internal generator to generate electricity. Compared to solar power generation, hydropower generation, geothermal power generation, coal-fired power generation, or gas-fired power generation, wind power has substantially low greenhouse gas emissions, requires the least amount of water, and is the most beneficial way of generating electricity for social development.

Blades are one of the most important components of a wind power generator, and the main material of the blades is fiberglass, which is composed of resin (an epoxy polymer or polyester) and a fiber matrix. The function of using fiberglass is to enable the blades to withstand more powerful hurricane threats. Because wind power generators must be dismantled at the end of their life cycle, and the length of a wind turbine blade can be longer than the wing of a Boeing 747, therefore, before dismantling, the blades must be cut into pieces. A large towing vehicle must then be used to carry the pieces away. However, fiberglass is a material that cannot be easily crushed and reprocessed. As a result, the dismantled wind turbine blades cannot be effectively recycled. Apart from piling up the blades in landfills, there is almost no other way to deal with the problem. By 2025, China's decommissioned wind turbine blades will have reached 8,112 metric tons, and by 2028 and 2029, the figures will be as high as 412,784 metric tons and 715,664 metric tons, respectively, which will overwhelm landfills. Accordingly, how to use innovative hardware design or processing methods to effectively process and recycle wind turbine blades made of fiberglass is a problem that developers in related industries and researchers in composite material recycling technology need to continue to endeavor to overcome and resolve.

SUMMARY OF THE INVENTION

In light of the many shortcomings in practical implementation of traditional methods of recycling composite materials, the inventor of the present invention with unrelenting spirit, backed by extensive professional knowledge and many years of practical experience, has made additional improvements to traditional recycling processing methods. And based on this, the present invention was researched and developed.

The main object of the present invention lies in providing a recycling processing method for wind turbine blades, and more particularly to using an acidic degradation solution to carry out a processing method for recycling waste material from wind turbine blades, which mainly uses a hardware design that involves immersing the waste material comprising composite material of fiberglass or carbon fiber in the acidic degradation solution, effectively causing the composite waste material to swell and separate to form degradable glass fiber cloth, to achieve a glass fiber cloth with no surface residual glue and a resin degreasing rate of 99.6%, and thereby effectively achieving recyclables of resin and fiberglass or carbon fiber removed from composite material. The recycling processing method involves carrying out a first degradation process at normal temperature to save hardware costs, and then uses a fractionation by distillation method to reclaim the degradation solution, which can then be reused. Hence, the recycling processing method has the advantages of involving a simple manufacturing process, high efficiency, and the ability to process waste materials on-site, as well as eliminating the need to bear the high cost of transportation.

In order to achieve the aforementioned object, the inventor of the present invention discloses a recycling processing method for wind turbine blades, wherein waste material is first cut into a plurality of waste material blocks. Next, the waste material blocks are immersed into degradation solution to carry out a first degradation process, to form a plurality of swollen waste material blocks and a degradation residual liquid. The degradation solution comprises a main component, an auxiliary component, and clear water, wherein the main component of the degradation solution is selected and made up from either one or a combination of two or more of the following acids: formic acid, acetic acid, propionic acid, and butyric acid. The auxiliary component is selected and made up from either one or a combination of two or more of the following compounds: nickel nitrate, copper nitrate, nickel chloride, copper chloride, hydrogen peroxide, ferrous chloride, cuprous chloride, zinc chloride, aluminum chloride, copper acetate or potassium permanganate. Next, the swollen waste material blocks are cleaned and separated into fibrous layer material and non-fibrous layer material, after which the fibrous layer material is immersed into the degradation solution to proceed with a second degradation process, to form a plurality of fibrous material and degradation residual liquid. Finally, the degradation residual liquid is recovered and a separation and purification process carried out thereon.

In the above-described recycling processing method for wind turbine blades, the waste material is composed of either one or two or more of process waste or discarded products waste material including wind turbine blades, bicycles or badminton rackets.

In the above-described recycling processing method for wind turbine blades, each of the waste material blocks is 5 meters long and 1 meter wide.

In the above-described recycling processing method for wind turbine blades, the mass ratio of the waste material blocks to the degradation solution is between 1:1.5 and 1:20.

In the above-described recycling processing method for wind turbine blades, the ratio between the main components, the auxiliary components, and the clear water in the degradation solution is between 5~8:1~3:0.5~1.5, respectively.

In the above-described recycling processing method for wind turbine blades, the first degradation process involves immersing the waste material blocks into the degradation solution for 5 to 72 hours at normal temperature and normal pressure.

In the above-described recycling processing method for wind turbine blades, the normal temperature lies between 18° C. and 30° C.

In the above-described recycling processing method for wind turbine blades, the fibrous layer material is composed of fiber composite material including carbon fiber or fiberglass.

In the above-described recycling processing method for wind turbine blades, the non-fibrous layer material comprises either metal, foam, plastic bags, or miscellaneous waste or a combination of two or more of these materials.

In the above-described recycling processing method for wind turbine blades, the second degradation process involves immersing the fibrous layer material into the degradation solution for 30 minutes to 8 hours at normal pressure and high temperature.

In the above-described recycling processing method for wind turbine blades, the mass ratio of the fibrous material to the degradation solution is between 1:2 and 1:18.

In the above-described recycling processing method for wind turbine blades, the high temperature lies between 60° C. to 80° C.

In the above-described recycling processing method for wind turbine blades, a breaking process is carried out by one of the following machines: a roller breaking machine, disc saw cutting machine, wet cutting machine or a wire saw cutting machine.

In the above-described recycling processing method for wind turbine blades, the second degradation process involves immersing the fibrous waste material into the degradation solution for 30 minutes to 8 hours at normal pressure and high temperature.

In the above-described recycling processing method for wind turbine blades, the separation and purification process involves distilling the degradation residual liquid to form tar and the degradation solution.

Accordingly, the recycling processing method for wind turbine blades of the present invention mainly uses a hardware design that involves immersing waste material comprising composite material of fiberglass or carbon fiber in an acidic degradation solution, effectively causing the composite waste material to swell and separate to form degradable glass fiber cloth, which is finally cleaned and dried, achieving a glass fiber cloth with no surface residual glue and a resin degreasing rate of 99.6%, effectively achieving recyclables of resin and fiberglass or carbon fiber removed from composite material. The recycling processing method involves carrying out a first degradation process at normal temperature to save hardware costs, and then uses a fractionation by distillation method to reclaim the degradation solution, which can then be reused. Hence, the recycling processing method has the advantages of involving a simple manufacturing process, high efficiency, and the ability to process waste materials on-site. as well as eliminating the need to bear the high cost of transportation.

To enable a further understanding of said objectives, structures, characteristics, and effects, as well as the technology and methods used in the present invention and effects achieved, a brief description of the drawings is provided below followed by a detailed description of the preferred embodiments.

DETAILED DESCRIPTION OF THE PREFERRED EMBODIMENTS

In order to enable the review committee to have a better understanding and knowledge of the objectives, characteristics, and effectiveness of the present invention, the following in conjunction with the drawings provides a detailed description of the embodiments disclosed herein. It is of course to be understood that the embodiments described herein are merely illustrative of the principles of the invention and that a wide variety of modifications thereto may be effected by persons skilled in the art without departing from the spirit and scope of the invention as set forth in the claims.

First, a recycling processing method for wind turbine blades of the present invention is a processing method that mainly uses an acidic degradation solution to carry out a swelling and separation process of at least one waste material 1 to reclaim recyclables containing fiberglass or carbon fibers. The waste material 1 is composed of either one or two or more of process waste or discarded products waste material including wind turbine blades, bicycles or badminton rackets. Moreover, the waste material 1 is mainly fiber composite material composed of carbon fiber (carbon fiber reinforced plastic (CFRP)) or glass fiber (glass fiber reinforced plastic (GFRP)). In the first preferred embodiments of the present invention, the swollen and reclaimed waste material 1 is mainly made up from wind turbine blades. Accordingly, a recycling processing method for wind turbine blades of the present invention mainly uses a hardware design that involves immersing the waste material 1 comprising a composite material of fiberglass or carbon fiber in an acidic degradation solution 2, effectively causing the composite waste material 1 to swell and separate, forming degradable glass fiber cloth that is finally cleaned and dried, to achieve a glass fiber cloth with no surface residual glue and a resin degreasing rate of 99.6%, thereby effectively achieving recyclables of resin and fiberglass or carbon fiber removed from composite material. The recycling processing method involves carrying out a first degradation process at normal temperature to save hardware costs, and then uses a fractionation by distillation method to reclaim the degradation solution, which can then be reused. Hence, the recycling processing method has the advantages of involving a simple manufacturing process, high efficiency, and the ability to process waste materials on-site, as well as eliminating the need to bear the high cost of transportation.

Figure 1:
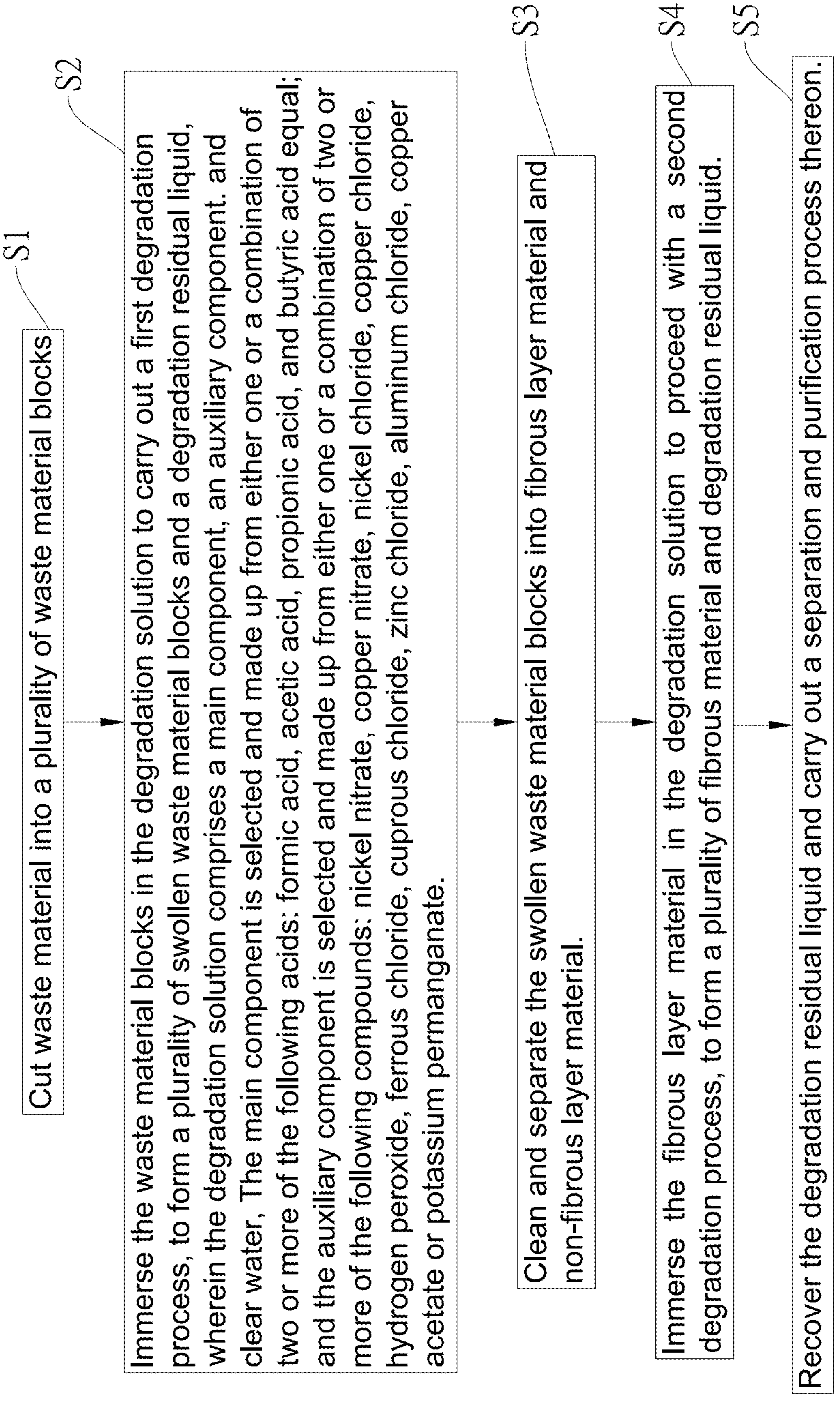
FIG. 1 is a step flow chart of a first preferred embodiment of a recycling processing method for wind turbine blades of the present invention.
Figure 2:
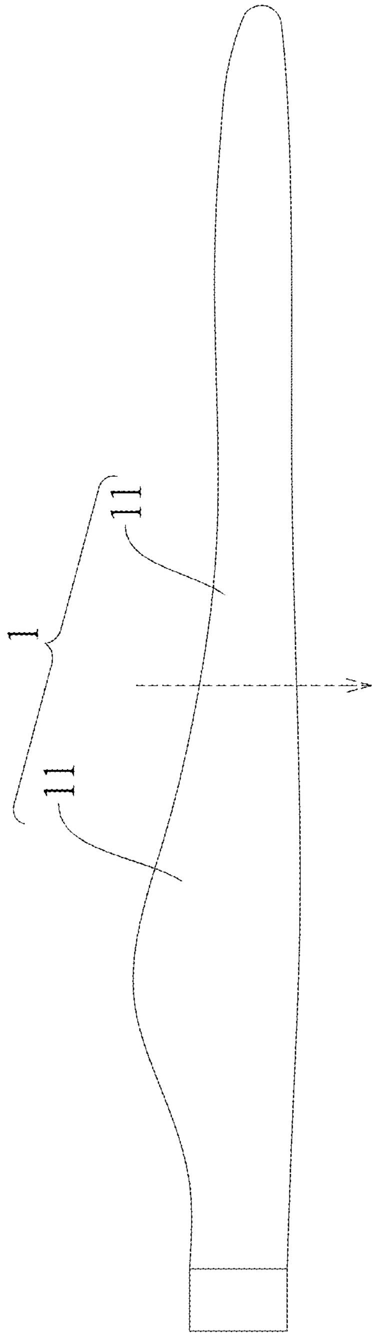
FIG. 2 is a schematic view showing cutting of waste material according to the first preferred embodiment of the recycling processing method for wind turbine blades of the present invention.
Figure 3:
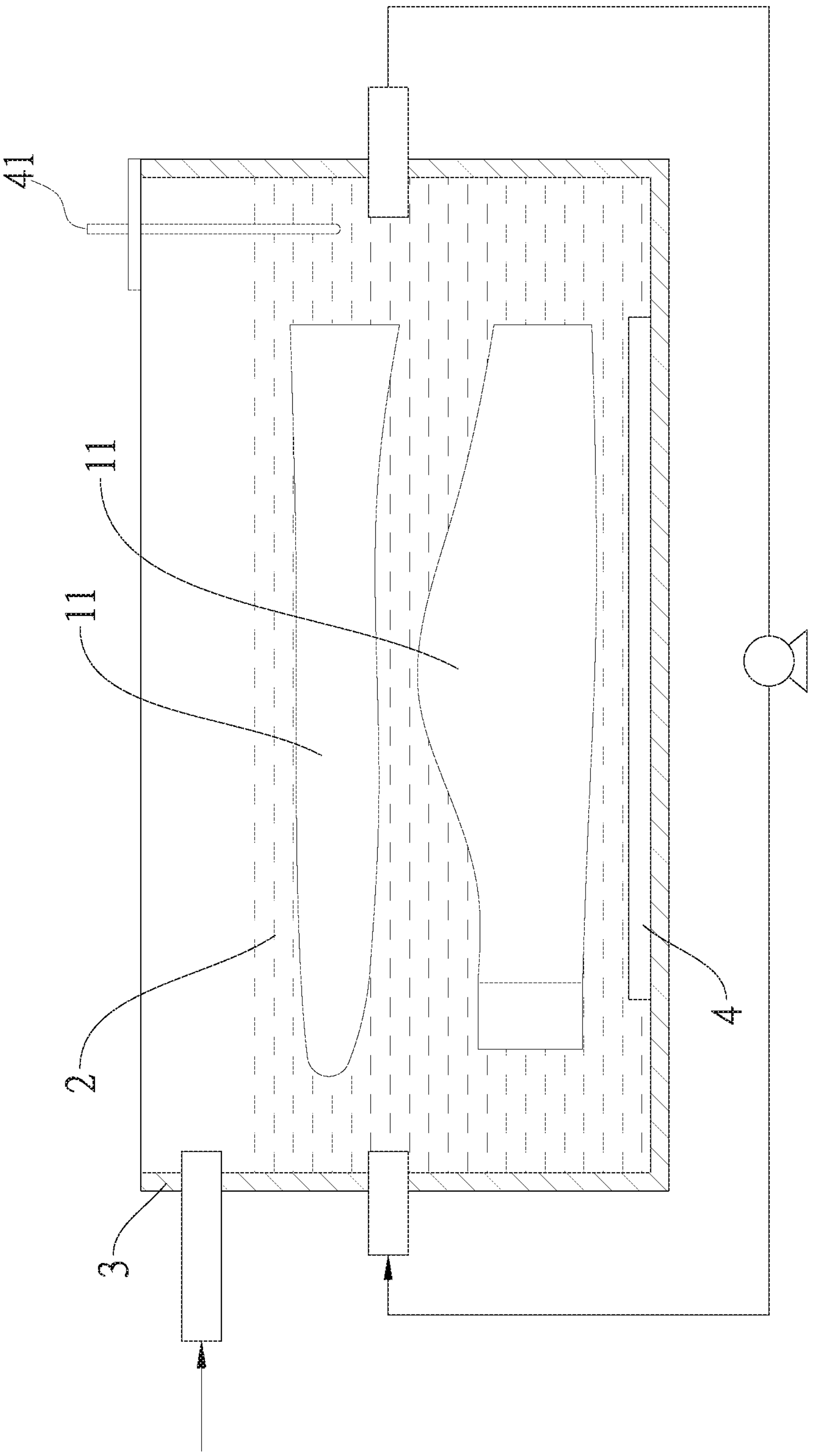
FIG. 3 is a schematic view of a first degradation process according to the first preferred embodiment of the recycling processing method for wind turbine blades of the present invention.

Referring to FIG. 1, which shows a recycling processing method for wind turbine blades of the present invention comprising at least the following steps:

a) S1: Cutting the waste material 1 into a plurality of waste material blocks 11, as shown in FIG. 2, which shows a schematic view depicting cutting of the waste material 1 according to the first preferred embodiment of the recycling processing method for wind turbine blades of the present invention. The original length of the waste material 1 of a wind turbine blade lies between 80 meters and 115 meters, and the width lies between 2 to 5 meters, which after preliminary cutting form the waste material blocks 11 of approximately 5 meters long and 1 meter wide, The cutting method can be, for example, but not limited to, in the direction of the dotted line shown in FIG. 2.

b) S2: Immersing the waste material blocks 11 in the degradation solution 2 to carry out the first degradation process, to form a plurality of swollen waste material blocks 12 and a degradation residual liquid. The degradation solution 2 comprises a main component, an auxiliary component, and clear water, wherein the main component is selected and made up from either one or a combination of two or more of the following acids: formic acid, acetic acid, propionic acid, and butyric acid equal; and the auxiliary component is selected and made up from either one or a combination of two or more of the following compounds: nickel nitrate, copper nitrate, nickel chloride, copper chloride, hydrogen peroxide, ferrous chloride, cuprous chloride, zinc chloride, aluminum chloride, copper acetate or potassium permanganate. The mass ratio between the waste material block 11 and the degradation solution 2 is between 1:1.5 and 1:20, and the component composition ratios of the main component, the auxiliary component and the clear water in the degradation solution 2 are between 5~8:1~3:0.5~1.5, respectively. Referring to FIG. 3, which shows a schematic view of the first degradation process according to the first preferred embodiment of the recycling processing method for wind turbine blades of the present invention, wherein the first degradation process involves soaking the waste material block 11 in the degradation solution 2 for 5 to 72 hours at normal temperature and normal pressure, with the normal temperature lying between 18° C. and 30° C. In other words, the degradation solution 2 is placed in a mixing tank 3, and the waste material blocks 11 are then immersed in the degradation solution 2 to proceed with the first degradation process. The mixing tank 3 is formed from, for example, but not limited to, a polyethylene plastic barrel.

Figure 4:
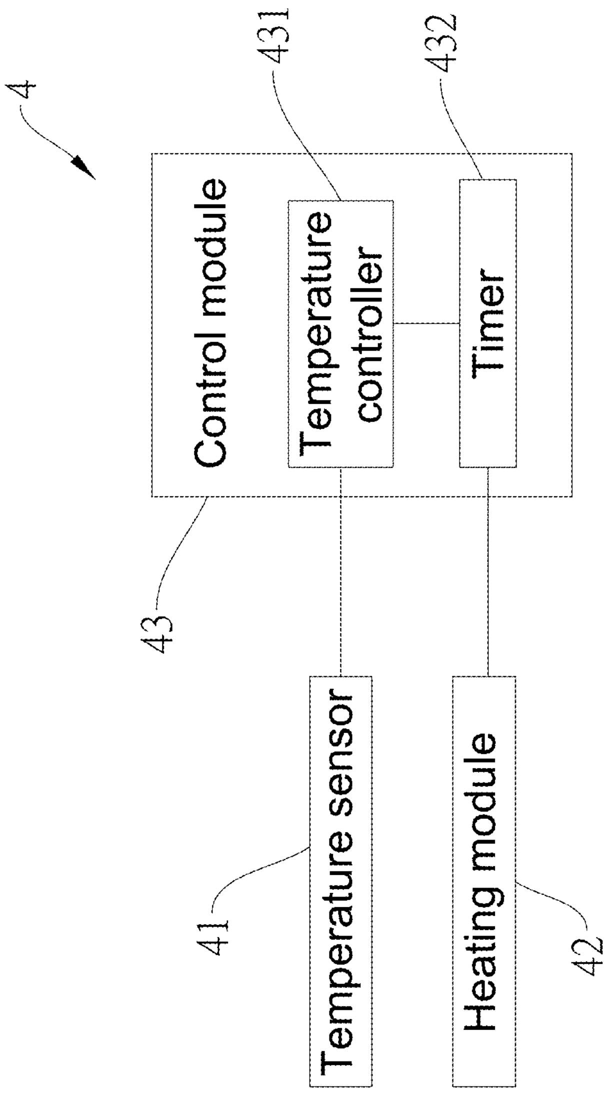
FIG. 4 is a block diagram of a heating unit of the first preferred embodiment of the recycling processing method for wind turbine blades of the present invention.

In addition, referring to FIG. 4, which shows a block diagram of a heating unit of the first preferred embodiment of the recycling processing method for wind turbine blades of the present invention, whereby, as shown in FIG. 3, a heating unit 4 is disposed in the bottom portion of the mixing tank 3, wherein the heating unit 4 is mainly used to control the temperature of the degradation solution 2, and the heating unit 4 is mainly assembled from at least a temperature sensor 41, a heating module 42, and a control module 43. The control module 43 comprises a temperature controller 431 and a timer 432, wherein the temperature sensor 41 is used to sense the actual temperature of the degradation solution 2 in the mixing tank 3, and the temperature controller 431 is used to determine the actual temperature of the degradation solution 2 and the difference value from the required temperature, thereby enabling activating the heating module 42 to heat the degradation solution 2 in the mixing tank 3. The timer 432 is used to calculate the time needed for the heating module 42 to heat the degradation solution 2 in the mixing tank 3. The heating module 42 uses either electric, gas or kerosene heating to preheat the degradation solution 2 in the mixing tank 3. In the first preferred embodiment of the present invention, the heating module 42 uses an electric heating method to heat the degradation solution 2. In the first preferred embodiment of the present invention, the waste material blocks 11 begin to swell after being immersed in the degradation solution 2 for approximately 3 hours, and after a further period of time, the degradation solution 2 will have decomposed the waste material blocks 11 layer by layer to form a degradable fiber cloth, at which time the resin degreasing rate is approximately 38.9%. Further, the degradation solution 2 enters the mixing tank 3 from an inlet on the left side of the mixing tank 3 to react with the waste material blocks 11, after which the degradation solution 2 exits the mixing tank 3 from an outlet on the right side of the mixing tank 3, that is, the degradation solution 2 forms a circuit in the mixing tank 3.

Figure 5:
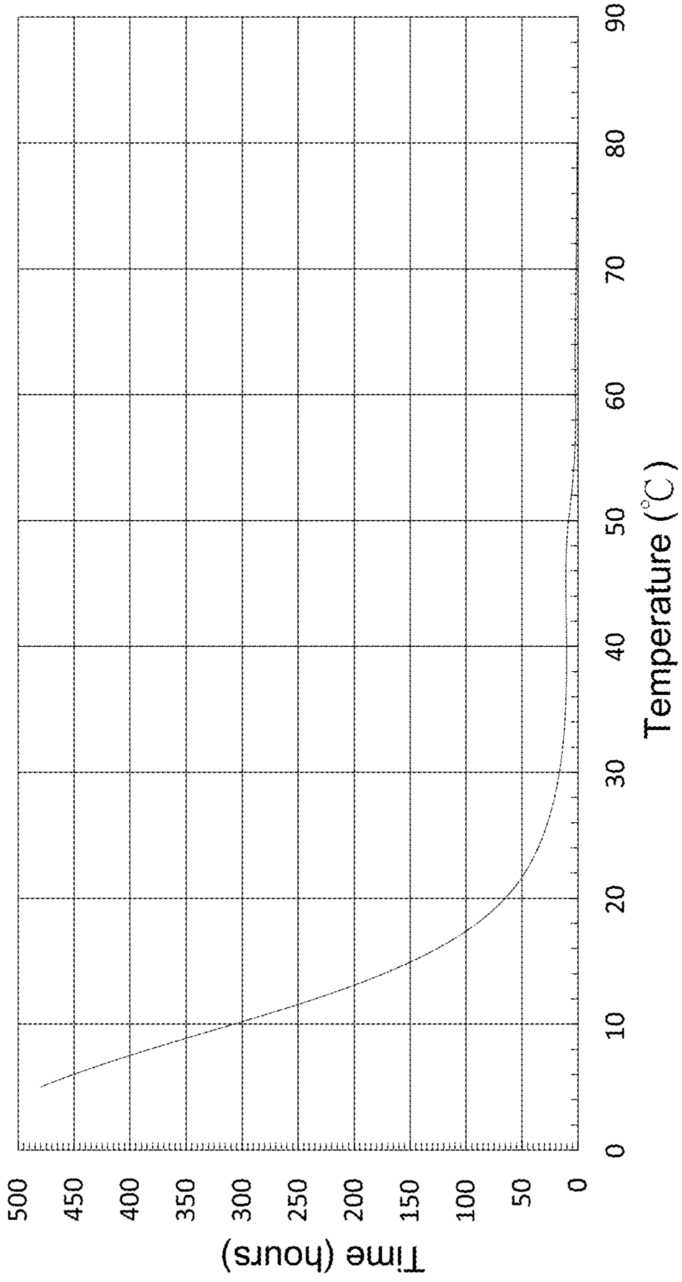
FIG. 5 is a degradation temperature and reaction time relational view of the first preferred embodiment of the recycling processing method for wind turbine blades of the present invention.
Figure 6:
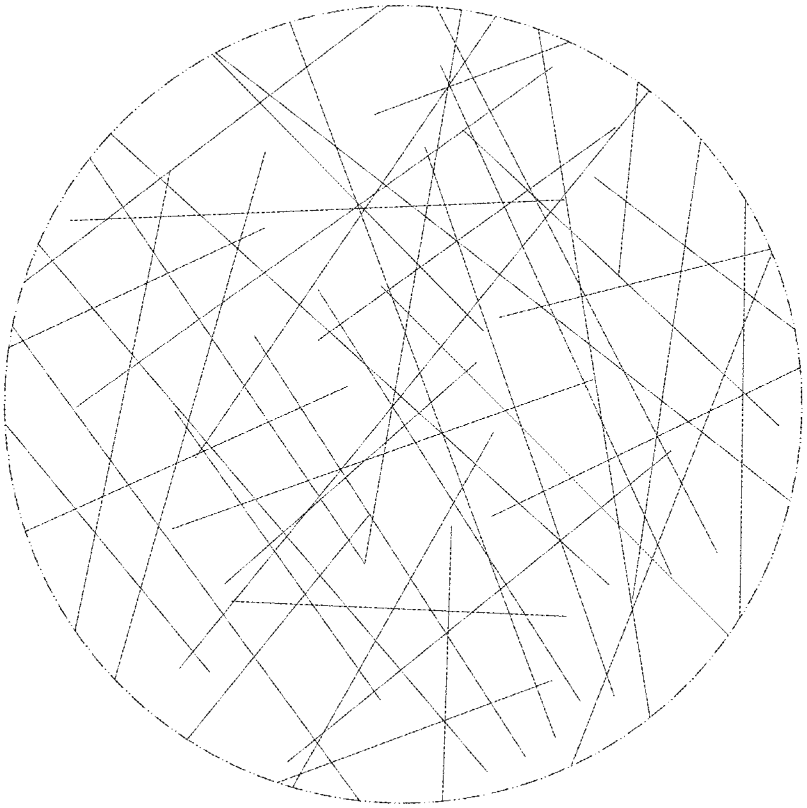
FIG. 6 is a schematic diagram of recycled fiber material according to the first preferred embodiment of the recycling processing method for wind turbine blades of the present invention.

Referring to FIG. 5, which shows a degradation temperature and reaction time relational view of the first preferred embodiment of the recycling processing method for wind turbine blades of the present invention, wherein the reaction time of the degradation solution 2 needed to degrade the waste material blocks 11 is in inverse proportion to the temperature, that is, when the temperature is 80° C., the reaction time for degradation only takes 0.8 hours, and when the temperature is 5° C., the reaction time for degradation requires up to 480 hours. In other words, the recycling and processing method for wind turbine blades of the present invention can also be used at low temperatures, that is, the waste materials 1 of wind turbine blades can be swollen and separated on-site in cold areas. Finally, the recyclables including fiberglass or carbon fiber are recovered without the need to spend high transportation costs, and thus effectively reducing expenditure.

c) S3: Cleaning and separating the swollen waste material blocks 12 into fibrous layer material and non-fibrous layer material, wherein the fibrous layer material is composed of fiber composite material including carbon fiber or fiberglass, and the non-fibrous layer material is a combination of either one or two or more of the following materials: metal, foam, plastic bags, or miscellaneous waste material or a combination of one or more than two of these materials.

d) S4: Further immersing the fibrous layer material in the degradation solution 2 to proceed with a second degradation process, to form a plurality of fibrous material and degradation residual liquid, wherein the second degradation process involves immersing the fibrous layer in the degradation solution 2 for 30 minutes to 8 hours at normal pressure and high temperature. The mass ratio of the fibrous layer material to the degradation solution 2 is between 1:2 and 1:18, and the high temperature lies between 60° C. and 80° C. As described in Step 2 (S2), the fibrous layer material is immersed in the degradation solution 2 in the mixing tank 3 to proceed with a further degradation process, finally cleaning and drying is carried out to achieve a fiber cloth with no surface residual glue and a resin degreasing rate of 99.6% (as shown in FIG. 6, which shows a schematic diagram of recycled fiber material according to the first preferred embodiment of the recycling processing method for wind turbine blades of the present invention.)

Figure 7:
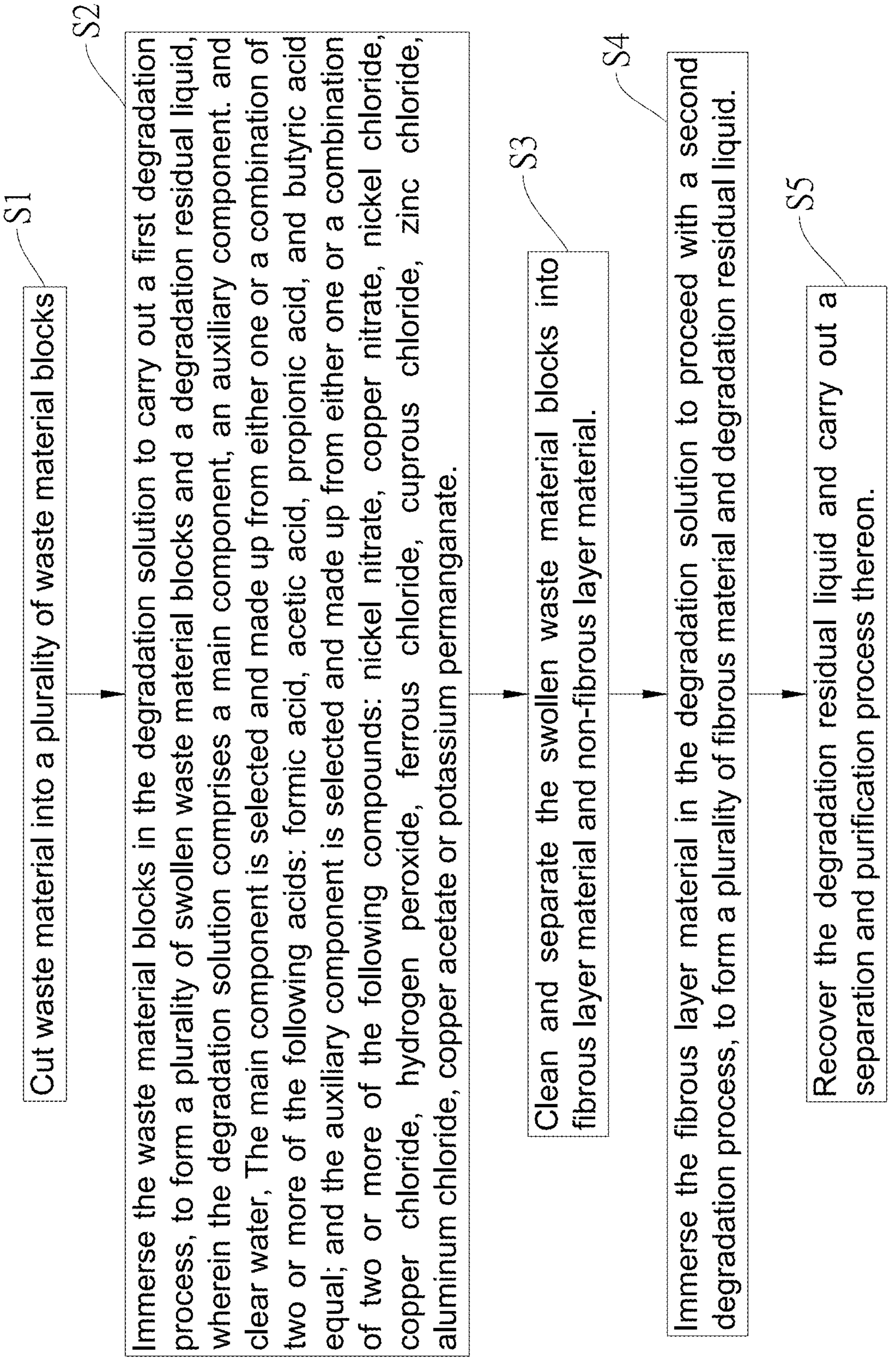
FIG. 7 is a step flow chart of a second preferred embodiment of the recycling processing method for wind turbine blades of the present invention.
Figure 8:
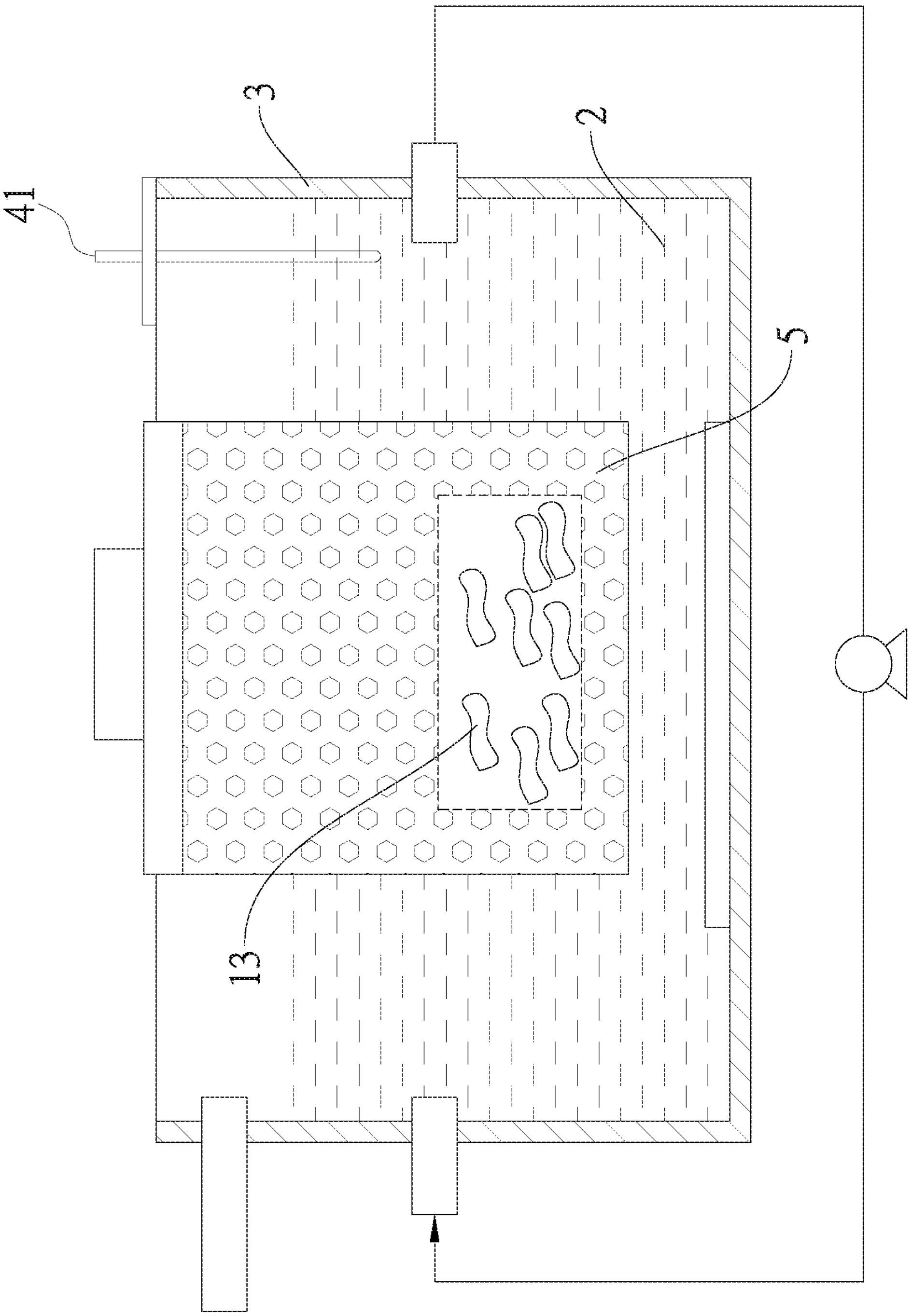
FIG. 8 is a schematic view of a second degradation process of the second preferred embodiment of the recycling processing method for wind turbine blades of the present invention.

Further, referring to FIGS. 7 and 8, which show a step flow chart of the second preferred embodiment of the recycling processing method for wind turbine blades of the present invention, and a schematic view of the second degradation process, respectively, wherein a breaking process is carried out prior to immersing the fibrous layer material in the degradation solution 2, thereby causing the fibrous layer material to form a plurality of waste material pieces 13 (see FIG. 8) (as described in the fourth step f) S41 of FIG. 7), enabling the waste material pieces 13 to more easily react with the degradation solution 2. The breaking process is carried out by one of the following machines: a roller breaking machine, disc saw cutting machine, wet cutting machine or a wire saw cutting machine. In the first preferred embodiment of the present invention, a wet cutting machine is mainly used to cut the fibrous layer material into the plurality of waste material pieces 13, which are first loaded into a meshed container 5, to prevent the waste material pieces 13 from falling to the bottom portion of the mixing tank 3. The meshed container 5 is then immersed in the degradation solution 2 of the mixing tank 3, thereby enabling the waste material pieces 13 to react with the degradation solution 2.

e) S5: Recovering the degradation residual liquid and carrying out a separation and purification process, wherein the separation and purification process involves distilling the degradation residual liquid to form tar and the degradation solution 2; that is, a distillation process is carried out on the degradation residual liquid in a distillation machine (not shown in the diagrams) to produce a first product of tar and a second product of the degradation solution 2. The tar is the resin contained in the waste materials 1 that can then be recycled or refined by manufacturers, and the degradation solution 2 of the second product can be recycled and once again used to react with the new waste materials 1.

The following 1st to 9th embodiments mainly describe specific experiments conducted on the waste materials 1 of decommissioned wind turbine blades, and the processing steps of the 1st embodiment to the 9th embodiment are all derived from Step 1 (S1) to Step 5 (S5).

The 1st Embodiment

Figure 9:
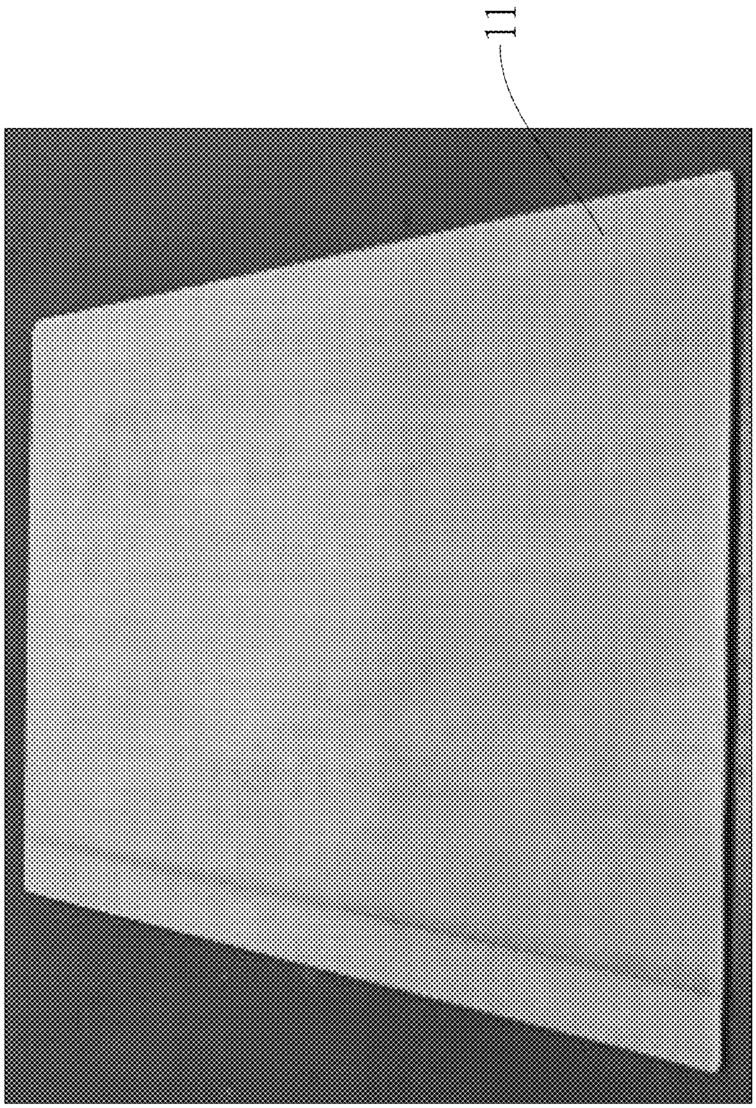
FIG. 9 is a schematic view of a waste material block of the 1st embodiment of the recycling processing method for wind turbine blades of the present invention.
Figure 10:
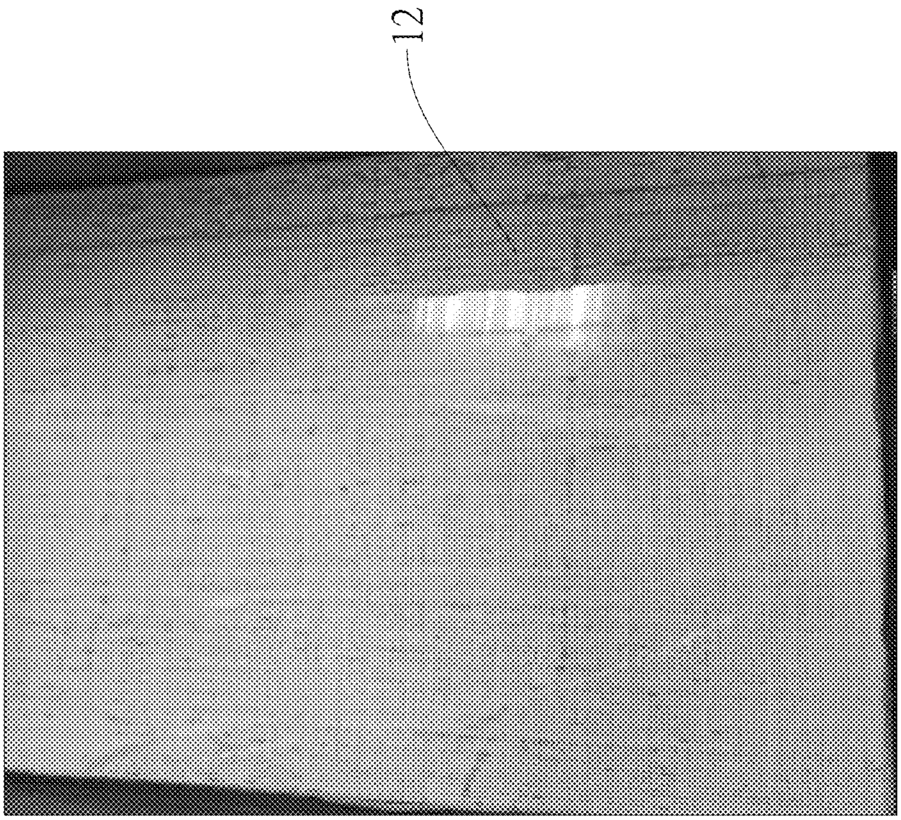
FIG. 10 is a schematic view of a swollen waste material block of the 1st embodiment of the recycling processing method for wind turbine blades of the present invention.
Figure 11:
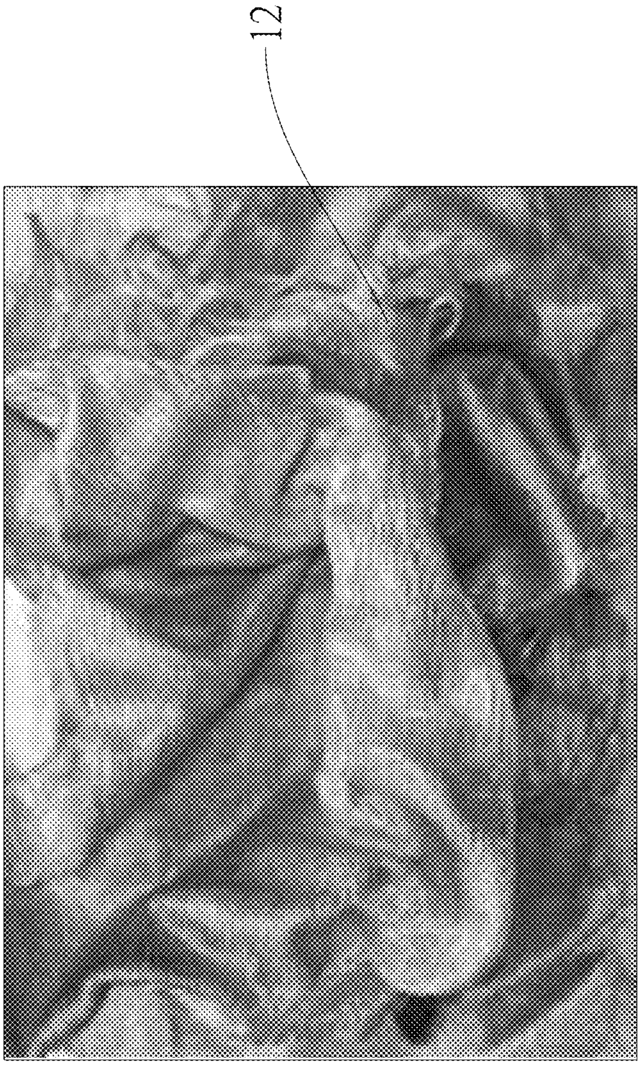
FIG. 11 is a schematic view of a fibrous layer material of the 1st embodiment of the recycling processing method for wind turbine blades of the present invention.
Figure 12:
FIG. 12 is a schematic view of the glass fiber cloth of the 1st embodiment of the recycling processing method for wind turbine blades of the present invention.
Figure 13:
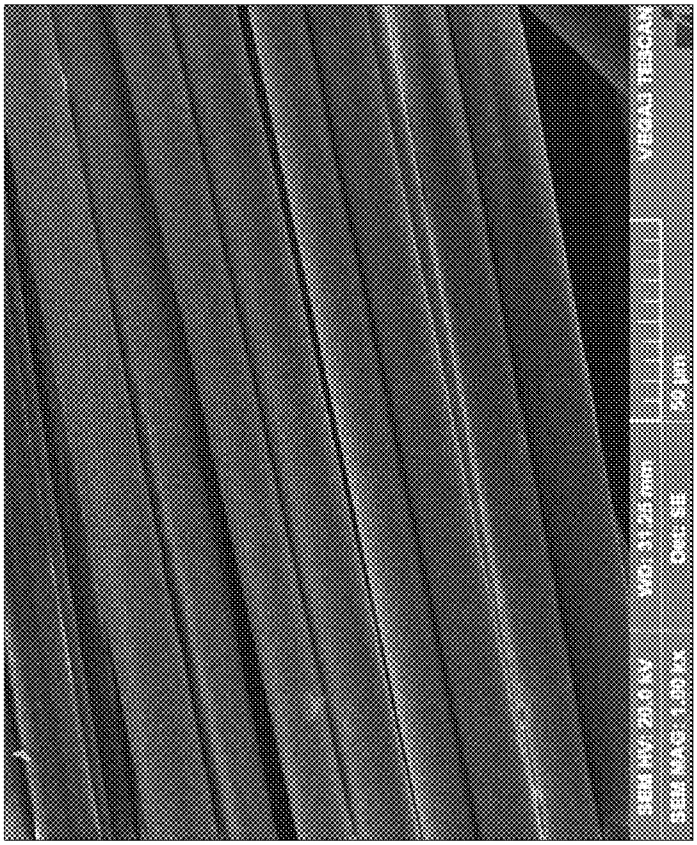
FIG. 13 is a scanning electron microscope (SEM) schematic view of a the glass fiber cloth of the 1st embodiment of the recycling processing method for wind turbine blades of the present invention.

Referring to FIG. 9, which shows a schematic view of a waste material block of the 1st embodiment of the recycling processing method for wind turbine blades of the present invention, wherein the waste materials 1 are cut into the waste material blocks (11), each of which has a length of 70 cm, width of 50 cm, thickness of 3 cm, and a weight of 1897 grams. The waste material blocks 11 are placed into a plastic barrel made from polyethylene filled with the degradation solution 2, wherein the proportion by weight of the waste material blocks 11 to the degradation solution 2 is 1:6.2. The degradation solution 2 is mainly a mixture of acetic acid, formic acid, hydrogen peroxide, and clear water, which are mixed in the ratios 7:0.8:2:1.5, respectively. The degradation reaction is carried out at an ambient temperature between 16° C. and 18° C. In addition, referring to FIG. 10, which shows a schematic view of a swollen waste material block from the recycling processing method for wind turbine blades of the present invention, wherein the degradation condition was observed every hour, and after 3 hours, the waste material block 11 had already a swollen appearance and had formed a glass fiber cloth of the swollen waste material block 12. After 24 hours, the glass fiber cloth had separated into layers, forming a fibrous layer material, at which time the resin degreasing rate was approximately 38.9%. Referring to FIGS. 11 to 13, which show a schematic view of a fibrous layer material of the 1st embodiment, a schematic view of the glass fiber cloth of the first embodiment, and a SEM (scanning electron microscope) schematic view of a the glass fiber cloth of the first embodiment of the recycling processing method for wind turbine blades of the present invention, respectively, wherein the fibrous layer material is broken into the waste material pieces 13, each having a size of 30 cm×30 cm, and placed in the degradation solution 2 already heated to 80° C. by the heating unit 4. The proportion by weight of the waste material pieces 13 to the degradation solution 2 was 1:6.2, and the component composition ratios of the degradation solution 2 was changed to 8:1.1:2.5:1.5. After 20 minutes, the fibrous material and degradation residual liquid formed, and the fibrous material was taken out and cleaned with water, filtered, and dried to obtain the glass fiber cloth with no residual glue on the surface thereof, at this time the resin degreasing rate is 99.6%. When the surface of the glass fiber cloth was observed through SEM, no epoxy resin residue was found on the surface of the glass fiber cloth, and the tensile strength was between 1600-1850 MPa.

The 2nd Embodiment

Figure 14:
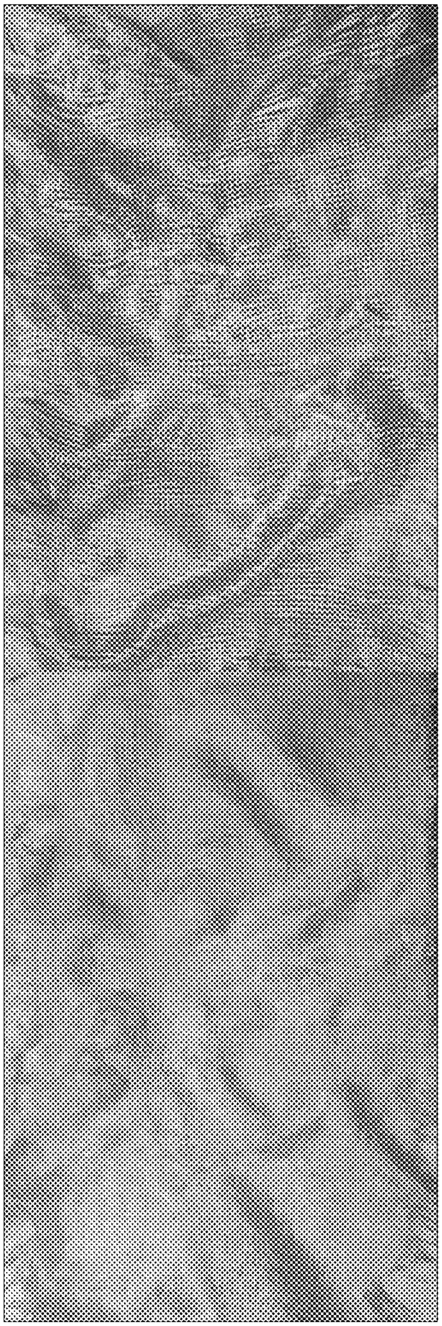
FIG. 14 is a schematic view of glass fiber cloth of the 2nd embodiment of the recycling processing method for wind turbine blades of the present invention.

The waste materials 1 were cut into the waste material blocks 11, each with a length of 47.5 cm and a width of 32 cm and placed in the degradation solution 2, wherein the proportion by weight of the waste material blocks 11 to the degradation solution 2 was 1:6, and the degradation solution 2 was mainly a mixture of acetic acid, zinc chloride, hydrogen peroxide, and clear water, mixed in the ratios 6:0.1:2.5:1.2, respectively. Referring to FIG. 14, which shows a schematic view of glass fiber cloth of the 2nd embodiment of the recycling processing method for wind turbine blades of the present invention, wherein the fibrous material was taken out after a reaction time of 60 minutes, cleaned with clear water, filtered and dried, achieving a glass fibre cloth with no residual glue on the surface thereof, and a resin degreasing rate of 97.8%.

The 3rd Embodiment

Figure 15:
FIG. 15 is a schematic view of glass fiber cloth of the 3rd embodiment of the recycling processing method for wind turbine blades of the present invention.

The waste materials 1 were cut into the waste material blocks 11, each with a length of 57 cm, a width of 49 cm, and a thickness of 31 mm and placed in the degradation solution 2, wherein the waste materials (1) were mainly assembled from 29 layers of fiberglass. The waste material blocks 11 and the degradation solution 2 in a proportion by weight of 1:7.6 underwent a reaction at a temperature of 80° C. The degradation solution 2 was mainly a mixture of acetic acid, nickel nitrate, ferrous chloride, and clear water, mixed in the ratios 8:2.1:2.5:1, respectively. Referring to FIG. 15, which shows a schematic view of glass fiber cloth of the 3rd embodiment of the recycling processing method for wind turbine blades of the present invention, wherein, after a reaction time of 410 minutes, the fibrous material was taken out, cleaned with clear water, filtered, and dried, achieving a glass fibre cloth with no residual glue on the surface thereof, and a resin degreasing rate of 80.8%.

The 4th Embodiment

Figure 16:
FIG. 16 is a schematic view of glass fiber cloth of the 4th embodiment of the recycling processing method for wind turbine blades of the present invention.

The waste materials 1 were cut into the waste material blocks 11, each with a length of 53 cm, a width of 36 cm, and a thickness of 22 mm and placed in the degradation solution 2, wherein the waste materials 1 were mainly assembled from 20 layers of fiberglass. The degradation solution 2 was mainly a mixture of propionic acid, maleic acid, copper chloride (cupric chloride), and clear water, mixed in the ratios 6.5:2.2:2:1.2, respectively. Referring to FIG. 16, which shows a schematic view of glass fiber cloth of the 4th embodiment of the recycling processing method for wind turbine blades of the present invention, wherein, after a reaction time of 220 minutes, the fibrous material was taken out, cleaned with clear water, filtered, and dried, achieving a glass fibre cloth with no residual glue on the surface thereof, and a resin degreasing rate of 65.8%.

The 5th Embodiment

Figure 17:
FIG. 17 is a schematic view of glass fiber cloth of the 5th embodiment of the recycling processing method for wind turbine blades of the present invention.

The waste materials 1 were cut into the waste material blocks 11, each with a length of 54 cm, a width of 39 cm, and a thickness of 14 mm and placed in the degradation solution 2, wherein the waste materials 1 were mainly assembled from 12 layers of fiberglass. The waste material blocks 11 and the degradation solution 2 in a proportion by weight of 1:5.8 underwent a reaction at a temperature of 80° C. The degradation solution 2 was mainly a mixture of butyric acid (ethyl acetic acid), hydrogen peroxide, zinc chloride, and clear water, mixed in the ratios 7:2.8:2:4, respectively. Referring to FIG. 17, which shows a schematic view of glass fiber cloth of the 5th embodiment of the recycling processing method for wind turbine blades of the present invention, wherein, after a reaction time of 105 minutes, the fibrous material was taken out, cleaned with clear water, filtered, and dried, achieving a glass fibre cloth with no residual glue on the surface thereof, and a resin degreasing rate of 90.8%.

The 6th Embodiment

Figure 18:
FIG. 18 is a schematic view of glass fiber cloth of the 6th embodiment of the recycling processing method for wind turbine blades of the present invention.

The waste materials 1 were cut into the waste material blocks 11, each with a length of 54 cm, a width of 30 cm, and a thickness of 7 mm and placed in the degradation solution 2, wherein the waste materials 1 were mainly assembled from 4 layers of fiberglass. The waste material blocks 11 and the degradation solution 2 in a proportion by weight of 1:17.6 underwent a reaction at a temperature of 80° C. The degradation solution 2 was mainly a mixture of caproic acid (acetic acid), hydrogen peroxide, potassium permanganate, and clear water, mixed in the ratios 7.5:2.8:0.4:1.2, respectively. Referring to FIG. 18, which shows a schematic view of glass fiber cloth of the 6th embodiment of the recycling processing method for wind turbine blades of the present invention, wherein, after a reaction time of 50 minutes, the fibrous material was taken out, cleaned with clear water, filtered, and dried, achieving a glass fibre cloth with no residual glue on the surface thereof, and a resin degreasing rate of 98.4%.

The 7th Embodiment

Figure 19:
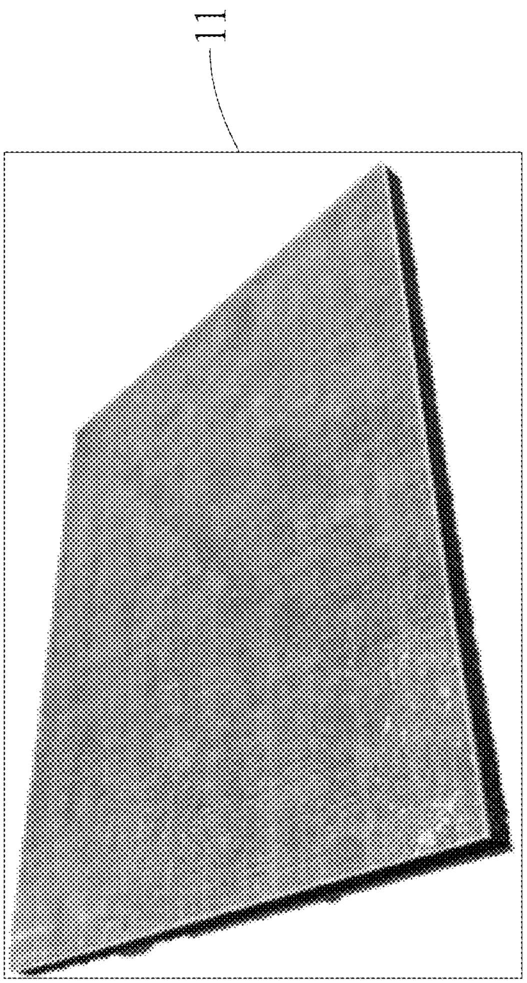
FIG. 19 is a schematic view of a waste material block of the 7th embodiment of the recycling processing method for wind turbine blades of the present invention.
Figure 20:
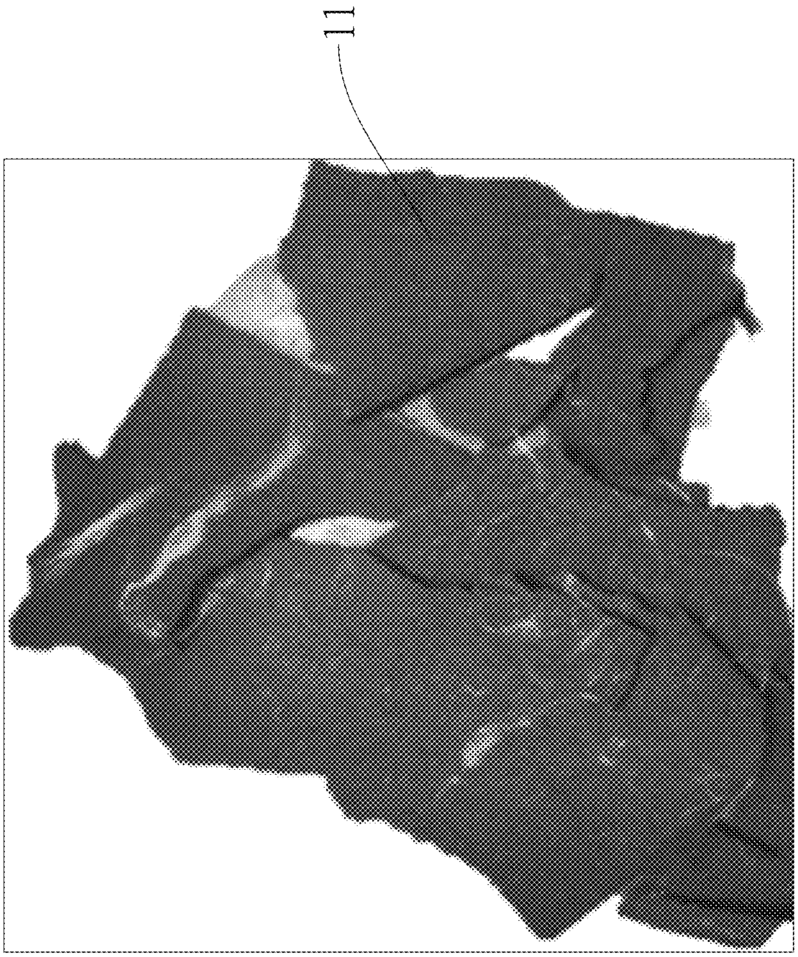
FIG. 20 is a schematic view of a fiberglass composite board of the 7th embodiment of the recycling processing method for wind turbine blades of the present invention.

Referring to FIG. 19, which shows a schematic view of a waste material block of the 7th embodiment of the recycling processing method for wind turbine blades of the present invention, wherein the waste materials 1 were cut into the waste material blocks 11, each with a length of 60 cm, a width of 40 cm, a thickness of 23 mm, and a weight of 2514 grams and placed in the degradation solution 2. Each of the waste materials 1 was a sandwich structure comprising a composite board with upper and lower layers of fiberglass of 2 mm thick, and a core material of PU (polyurethane) foam board. The waste material blocks 11 and the degradation solution 2 in a proportion by weight of 1:5.5 underwent a reaction at a temperature of 18° C. to 22° C. The degradation solution 2 was mainly a mixture of acetic acid, oxalic acid, hydrogen peroxide, nickel nitrate, and clear water, mixed in the ratios 7:1.2:3:0.5:1.5, respectively. Degradation was observed every hour, and after 4 hours, the upper and lower surface layers of the waste material blocks 11 already had a swollen appearance. After 24 hours, the glass fiber boards of the waste material block 11 had separated from the central foam core material. Referring to FIG. 20, which shows a schematic view of a fiberglass composite board of the 7th embodiment of the recycling processing method for wind turbine blades of the present invention.

Next, under the conditions of the 1st embodiment, the fiberglass composite boards were placed in the degradation solution 2 at a temperature of 80° C., and after a reaction time of 20 minutes, the fibrous material was taken out, cleaned with clear water, filtered, and dried, achieving a glass fibre cloth with no residual glue on the surface thereof, and a resin degreasing rate of 99.3%.

The 8th Embodiment

Figure 21:
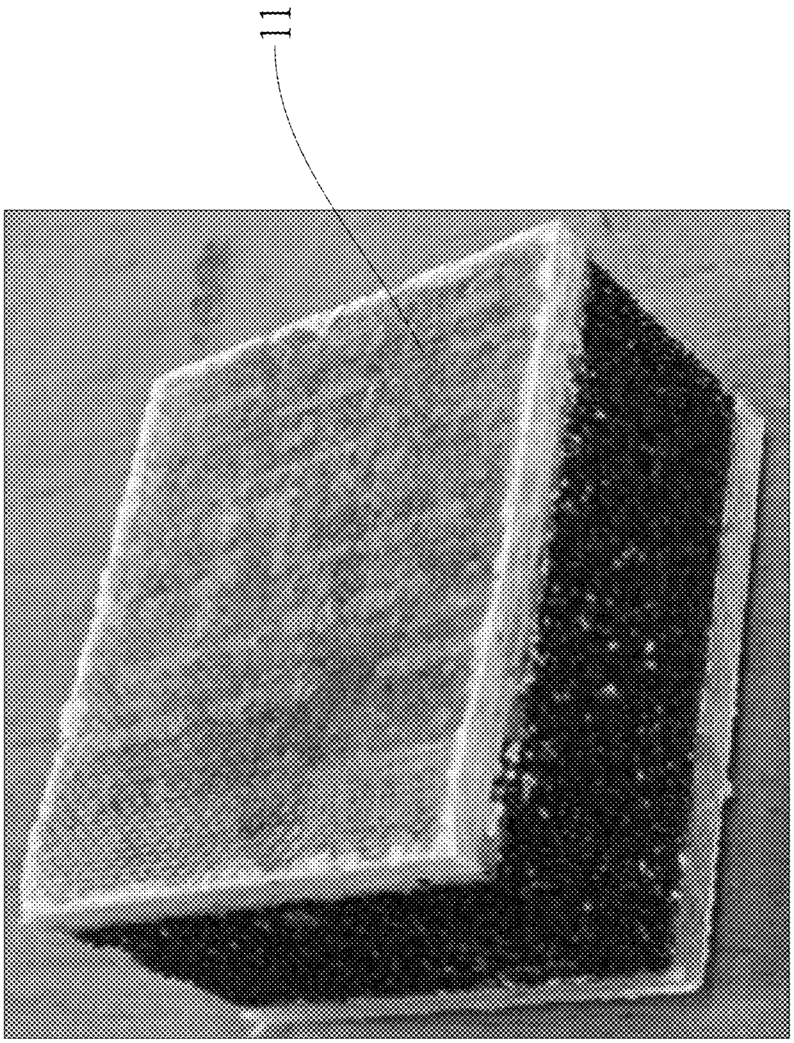
FIG. 21 is a schematic view of a waste material block of the 8th embodiment of the recycling processing method for wind turbine blades of the present invention.

Referring to FIG. 21, which shows a schematic view of a waste material block of the 8th embodiment of the recycling processing method for wind turbine blades of the present invention, wherein the waste materials 1 were cut into the waste material blocks 11 having sandwich form with a length of 40 cm, a width of 30 cm, and a thickness of 23 mm, and placed in the degradation solution 2. Each of the waste material blocks 11 was a composite board with upper and lower layers of fiberglass of 2 mm thick, and the core material was PU foam board. Further the waste material blocks 11 and the degradation solution 2 in a proportion by weight of 1:7.6 underwent a reaction at a temperature of 80° C. The degradation solution 2 was mainly a mixture of acetic acid, tartaric acid, hydrogen peroxide, and clear water, mixed in the ratios 7:1:2.7:1.6, respectively. After 40 minutes, the fibrous material was taken out, cleaned with clear water, filtered, and dried, achieving a glass fibre cloth with no residual glue on the surface thereof, and a resin degreasing rate of 96.8%.

The 9th Embodiment

Figure 22:
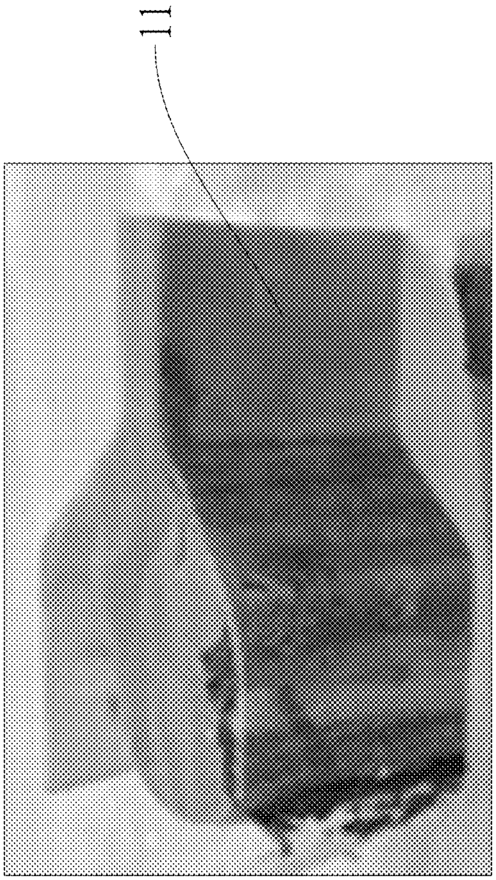
FIG. 22 is a schematic view of a waste material block of the 9th embodiment of the recycling processing method for wind turbine blades of the present invention.
Figure 23:
FIG. 23 is a schematic view of a fibrous layer material of the 9th embodiment of the recycling processing method for wind turbine blades of the present invention.
Figure 24:
FIG. 24 is a schematic view of glass fiber cloth of the 9th embodiment of the recycling processing method for wind turbine blades of the present invention.

Referring to FIG. 22, which shows a schematic view of a waste material block of the 9th embodiment of the recycling processing method for wind turbine blades of the present invention, wherein the waste materials 1 were cut into the waste material blocks 11, each with a length of 50 cm, a width of 30 cm, a thickness of 23 mm, and a weight of 158 grams, and placed in the degradation solution 2. Each of the waste materials 1 comprised a composite board with upper and lower layers of fiberglass of 1 mm thick assembled using structural glue therebetween. Moreover, the waste material blocks 11 and the degradation solution 2 in a proportion by weight of 1:2 underwent a reaction at a temperature of 18° C. to 22° C. The degradation solution 2 was mainly a mixture of acetic acid, tartaric acid, hydrogen peroxide, and clear water, mixed in the ratios 7:1:2.7:1.6, respectively. Referring to FIGS. 23 and 24, which show a schematic view of a fibrous layer material of the 9th embodiment, and a schematic view of glass fiber cloth of the 9th embodiment of the recycling processing method for wind turbine blades of the present invention, respectively, wherein, after a reaction time of 48 hours, the structural glue had come away from the middle of the waste material blocks 11 and was removed. The fiberglass composite board continued to interact with the degradation solution 2, wherein the proportion by weight of the fiberglass composite board and the degradation solution 2 at 80° C. was 1:1.8. The component composition ratios of the degradation solution 2 was changed to 7.2:2:2.5:1, and after 70 minutes, the fibrous material was taken out, cleaned with clear water, filtered, and dried, achieving a glass fibre cloth with no residual glue on the surface thereof, and a resin degreasing rate of 84.3%.

From the above-described embodiments, compared with existing technologies and products, it can be understood that the isolation valve structure of the present invention is provided with the following advantages:

The recycling processing method for wind turbine blades of the present invention mainly uses a hardware design that involves immersing waste material comprising a composite material of fiberglass or carbon fiber in an acidic degradation solution, effectively causing the composite waste material to swell and separate to form degradable fiber cloth, and achieving a fiber cloth with no surface residual glue and a resin degreasing rate of 99.6%. Accordingly, recyclable material is achieved by effectively removing resin and fiberglass or carbon fiber from composite material, wherein a first degradation process is carried out at normal temperature to save hardware costs, and a fractionation by distillation method is used to reclaim the degradation solution, which can then be reused. The present invention has the main advantages of a simple manufacturing process, high efficiency, and the ability to process waste materials on-site, as well as eliminating the need to bear the high cost of transportation.

In conclusion, the recycling processing method for wind turbine blades of the present invention, through the above disclosed embodiments, unmistakably achieves the anticipated effectiveness. Furthermore, the contents of the present invention have not been publicly disclosed prior to this application, clearly complying with the essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A recycling processing method for wind turbine blades, comprising steps of:

a) cutting waste material into a plurality of waste material blocks of a wind turbine blade;

b) immersing the waste material blocks into a first degradation solution to carry out a first degradation process, forming a plurality of swollen waste material blocks and a degradation residual liquid; the first degradation solution comprises a main component, an auxiliary component, and water, wherein the main component is selected and made up from either one or a combination of two or more of the following acids: formic acid, acetic acid, propionic acid, and butyric acid; and the auxiliary component is selected and made up from either one or a combination of two or more of the following compounds: nickel nitrate, copper nitrate, nickel chloride, copper chloride, hydrogen peroxide, ferrous chloride, cuprous chloride, zinc chloride, aluminum chloride, copper acetate or potassium permanganate; the mass ratio of the waste material block to the first degradation solution is between 1:1.5 and 1:20; the first degradation process involves immersing the waste material blocks into the first degradation solution for 5 to 72 hours at a temperature between 18° C. to 30° C. and under normal pressure;

c) cleaning and separating the swollen waste material blocks into fibrous layer material and non-fibrous layer material;

d) immersing the fibrous layer material into a second degradation solution to proceed with a second degradation process, forming a plurality of swollen fibrous material and degradation residual liquid, wherein the mass ratio of the fibrous material to the second degradation solution is between 1:2 and 1:18, and the second degradation process involves immersing the fibrous material into the second degradation solution for 30 minutes to 8 hours under normal pressure and at a temperature between 60° C. to 80° C.; and e) recovering the degradation residual liquid and carrying out a separation and purification process thereon; wherein the ratio between the main components, the auxiliary components and the water in the second degradation solution is between 5~8:1~3:0.5~1.5, respectively, and the composition of the first degradation solution used in the first degradation process is different from the composition of the second degradation solution used in the second degradation process.

2. The recycling processing method according to claim 1, wherein each of the waste material blocks is 5 meters long and 1 meter wide.

3. The recycling processing method according to claim 1, wherein the fibrous layer material comprises fiber composite material of carbon fiber or fiberglass.

4. The recycling processing method according to claim 1, wherein the non-fibrous layer comprises one or a combination of two or more of the following materials: metal, foam, plastic bags or miscellaneous waste material.

5. The recycling processing method according to claim 1, further comprising step of carrying out f), a breaking process is further carried out prior to immersing the fibrous layer material into the first degradation solution, forming a plurality of waste material pieces.

6. The recycling processing method according to claim 5, wherein the breaking process is carried out by one of the following machines: a roller breaking machine, disc saw cutting machine, wet cutting machine or a wire saw cutting machine.

7. The recycling processing method according to claim 1, wherein the separation and purification process involves distilling the degradation residual liquid, to form tar and a third degradation solution.

* * * * *